US009813540B2

United States Patent
Choi

(10) Patent No.: US 9,813,540 B2
(45) Date of Patent: Nov. 7, 2017

(54) METHOD OF COMPUTING STATISTICAL VEHICLE DATA USING MOBILE TERMINAL AND APPARATUS FOR PERFORMING THE SAME

(71) Applicant: HYUNDAI MOTOR COMPANY, Seoul (KR)

(72) Inventor: Sung Hwan Choi, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/948,030

(22) Filed: Nov. 20, 2015

(65) Prior Publication Data

US 2016/0219140 A1    Jul. 28, 2016

(30) Foreign Application Priority Data

Jan. 27, 2015  (KR) .......................... 10-2015-0012907

(51) Int. Cl.
| | | |
|---|---|---|
| H04B 1/10 | (2006.01) | |
| H04M 1/725 | (2006.01) | |
| H04W 76/02 | (2009.01) | |
| G01C 21/26 | (2006.01) | |

(52) U.S. Cl.
CPC .......... *H04M 1/7253* (2013.01); *G01C 21/26* (2013.01); *H04W 76/02* (2013.01)

(58) Field of Classification Search
CPC ..... H04W 12/00; H04W 12/04; H04W 12/10; H04W 4/008; H04W 4/021; H04W 4/22; H04W 76/02
USPC ... 455/569.1, 569.2, 575.9, 456.1, 457, 458, 455/459
See application file for complete search history.

(56) References Cited

U.S. PATENT DOCUMENTS

| 2003/0083079 A1* | 5/2003 | Clark | ............... G08G 1/096716 |
| | | | 455/466 |
| 2004/0203554 A1* | 10/2004 | Simon | ............... H04W 52/0229 |
| | | | 455/345 |
| 2004/0225437 A1* | 11/2004 | Endo | ...................... G01C 21/34 |
| | | | 701/415 |

(Continued)

FOREIGN PATENT DOCUMENTS

| JP | 2007-205872 A | 8/2007 |
| KR | 10-2007-0051523 A | 5/2007 |

(Continued)

OTHER PUBLICATIONS

Korean Office Action dated Feb. 16, 2016 issued in Korean Patent Application No. 10-2015-0012907.

*Primary Examiner* — Jean Gelin
(74) *Attorney, Agent, or Firm* — McDermott Will & Emery LLP

(57) ABSTRACT

A method of creating statistical operation data using a mobile terminal in an audio video navigation (AVN) system of a vehicle includes wirelessly connecting the mobile terminal to the AVN system, receiving a signal set from at least one controller of the vehicle, and transmitting the received signal set to the wirelessly connected mobile terminal such that the mobile terminal creates the statistical operation data. In this instance, it is preferable that an application in which a computational logic for creation of the statistical operation data is defined be installed in the mobile terminal.

12 Claims, 2 Drawing Sheets

(56) References Cited

U.S. PATENT DOCUMENTS

| | | | | |
|---|---|---|---|---|
| 2005/0206534 A1* | 9/2005 | Yamane | G08G 1/0104 | 340/994 |
| 2005/0231394 A1* | 10/2005 | Machii | G08G 1/096716 | 340/995.13 |
| 2006/0178807 A1* | 8/2006 | Kato | B60R 11/04 | 701/117 |
| 2008/0036586 A1* | 2/2008 | Ohki | G01C 21/362 | 340/539.13 |
| 2009/0099766 A1* | 4/2009 | Nakamura | G01C 21/32 | 701/532 |
| 2009/0248283 A1* | 10/2009 | Bicego, Jr. | G01C 21/3691 | 701/117 |
| 2010/0063729 A1* | 3/2010 | Goto | G01C 21/26 | 701/533 |
| 2010/0295803 A1* | 11/2010 | Kim | G06F 3/0488 | 345/173 |
| 2011/0083032 A1* | 4/2011 | Marin | H04L 1/0072 | 714/2 |
| 2012/0197486 A1* | 8/2012 | Elliott | G07C 5/008 | 701/33.2 |
| 2014/0213238 A1* | 7/2014 | Giraud | G07C 5/008 | 455/418 |
| 2014/0278053 A1* | 9/2014 | Wu | G06T 11/00 | 701/408 |
| 2014/0307040 A1* | 10/2014 | Choi | H04W 4/046 | 348/14.01 |
| 2014/0323039 A1* | 10/2014 | Hong | H04B 7/24 | 455/39 |
| 2015/0035646 A1* | 2/2015 | Han | H04B 5/0056 | 340/5.72 |
| 2016/0029197 A1* | 1/2016 | Gellens | G05D 1/0011 | 455/404.1 |

FOREIGN PATENT DOCUMENTS

| | | |
|---|---|---|
| KR | 10-2011-0083962 A | 7/2011 |
| KR | 10-2011-0109310 A | 10/2011 |
| KR | 10-2013-0049006 A | 5/2013 |
| KR | 10-1330826 B1 | 11/2013 |
| KR | 10-1339454 B1 | 12/2013 |
| KR | 10-2014-0033293 A | 3/2014 |
| KR | 10-2014-0033294 A | 3/2014 |

* cited by examiner

METHOD OF COMPUTING STATISTICAL VEHICLE DATA USING MOBILE TERMINAL AND APPARATUS FOR PERFORMING THE SAME

CROSS-REFERENCE TO RELATED APPLICATION

This application claims priority to and the benefit of Korean Patent Application No. 10-2015-0012907, filed on Jan. 27, 2015 in the Korean Intellectual Property Office, the disclosure of which is hereby incorporated by reference as if fully set forth herein.

TECHNICAL FIELD

The present disclosure relates to a method of creating statistical operation data generated and collected when a vehicle is operated or updating a computational logic thereof, and an apparatus for performing the same.

BACKGROUND

Big data refers to data having a large scale, various types, and a high circulation and analysis speed or a data analysis method, and refers to a series of technologies used to analyze data. A vehicle manufacturer may analyze information generated in a manufacturing process to use the information for detecting an error in the process and enhancing vehicle quality, and analyze information generated in an operating process of a separate vehicle to use the information for marketing and for enhancing vehicle quality and service competency.

Vehicle customer relationship management (VCRM) may be given as an example of information management using bit data which is generated during a vehicle operating process. VCRM is implemented by transmitting controller signal information collected from a currently operated vehicle to a data center managed by a vehicle manufacturer.

More specifically, an audio video navigation (AVN) system of a vehicle samples signals of respective controllers, and computes statistics of data collected during operation according to a particular logic. However, the AVN system frequently processes various functions such as navigation, audio, telematics, etc. at the same time. Thus, when operation statistics information to be delivered to the data center is calculated, a load factor of a central processing unit (CPU) may be affected.

In addition, an analyzing side (that is, the data center) needs to change a sampling period of each signal, a scheme or a computational logic for statistics when collecting data during operation. To reflect a new computational logic for statistics in this circumstance, firmware or software of the AVN system needs to be updated. However, there is a problem in that a lot of cost and time are consumed to update all vehicles delivered to consumers.

SUMMARY

Accordingly, the present invention is directed to a method of more efficiently creating statistical operation data generated and collected when a vehicle is operated or updating a computational logic thereof, and an apparatus for performing the same.

Technical problems to be solved in the present invention are not limited to the above-mentioned technical problems, and other technical problems not mentioned may be clearly understood by those skilled in the art from description below.

To achieve these objects and other advantages and in accordance with the purpose of the invention, as embodied and broadly described herein, a method of creating statistical operation data using a mobile terminal in an audio video navigation (AVN) system of a vehicle includes wirelessly connecting the mobile terminal to the AVN system, receiving a signal set from at least one controller of the vehicle, and transmitting the received signal set to the wirelessly connected mobile terminal such that the mobile terminal creates the statistical operation data. In this instance, it is preferable that an application in which a computational logic for creation of the statistical operation data is defined be installed in the mobile terminal.

In another aspect of the present invention, an AVN system of a vehicle for creating statistical operation data using a mobile terminal includes a wireless communication unit wirelessly connected to the mobile terminal, a wired communication unit for receiving a signal set from at least one controller of the vehicle, and a controller for controlling the wireless communication unit to transmit the received signal set to the mobile terminal such that the wirelessly connected mobile terminal creates the statistical operation data. In this instance, it is preferable that an application in which a computational logic for creation of the statistical operation data is defined be installed in the mobile terminal.

In still another aspect of the present invention, a method of creating statistical operation data of a vehicle includes wirelessly connecting a mobile terminal to an audio video navigation (AVN) system of the vehicle, receiving, by the AVN system, a signal set from a controller of the vehicle, transmitting, by the AVN system, the received signal set to the wirelessly connected mobile terminal, creating, by the mobile terminal, the statistical operation data based on the signal set transmitted from the AVN system, and transmitting, by the mobile terminal, the created statistical data a telematics service (TMS) center.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts. The suffixes "module" and "unit" of elements herein are used for convenience of description and thus can be used interchangeably and do not have any distinguishable meanings or functions.

When a detailed description of known technology related to description of embodiments disclosed in this specification is determined to obscure the essence of the embodiments disclosed in this specification, the detailed description will be omitted. In addition, accompanying drawings merely aid in understanding of the embodiments disclosed in this specification, and a technical spirit disclosed in this specification is not limited to the accompanying drawings. It should be understood that the present invention includes all modifications, equivalents or substitutes within the spirit and scope of the present invention.

To reduce operation load of an audio video navigation (AVN) system for computation of statistical operation data and flexibly change a computational logic, an embodiment of the present invention proposes that, upon receiving a signal required for operation statistics from a controller in a vehicle, the AVN system transmit the signal to a mobile terminal such that the mobile terminal computes statistical operation data. More specifically, a data center provides the mobile terminal with an application in which a computational logic for computing statistical operation data is defined, and the mobile terminal computes signals of the controllers provided from a vehicle using the provided application, and then transmits a processed result to the data center.

Here, the mobile terminal may be a smartphone, a tablet, a smartwatch, etc., which is merely an example. It is possible to apply any type of mobile terminal which is capable of receiving a signal of a controller by being wirelessly connected to a vehicle, processing the signal into statistical operation data through computation using an application, and transmitting the processed data to the data center.

In addition, the data center may directly communicate with the mobile terminal, or communicate with the mobile terminal through a telematics service (TMS) center.

First, a description will be given of a configuration of apparatuses for performing embodiments of the present invention.

Figure 1:
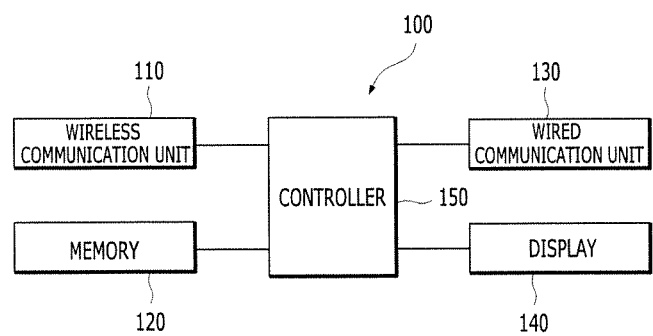
FIG. 1 is a block diagram illustrating an example of a configuration of an audio video navigation (AVN) system of a vehicle according to an embodiment of the present invention.

FIG. 1 is a block diagram illustrating an example of a configuration of an AVN system 100 of a vehicle according to an embodiment of the present invention.

Referring to FIG. 1, the AVN system 100 of the vehicle may include a wireless communication unit 110 connected to a mobile terminal using a wireless communication scheme to deliver a controller signal, a wired communication unit 130 for receiving a signal set corresponding to a source of statistical operation data from controllers in the vehicle at predetermined intervals or based on an event, a memory 120 for storing navigation map information, multimedia content, setting information, etc., a display 140 for visually outputting image information of the navigation map information or the multimedia content, or the statistical operation data, and a controller 150 for controlling the above-mentioned components and performing determination and operation required to implement the present embodiment. For example, the controller 150 may control an overall process of establishing a wireless data path to the mobile terminal, and deliver the signal set to the wirelessly connected mobile terminal.

Next, a description will be given of a process of computing the statistical operation data according to the present invention and delivering the computed statistical operation data to the data center with reference to FIG. 2.

Figure 2:
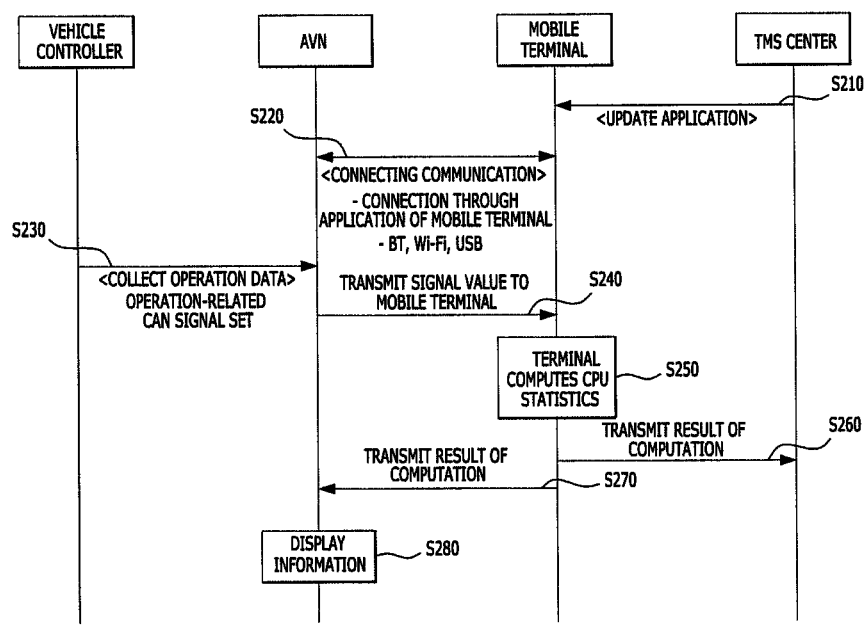
FIG. 2 is a flowchart illustrating an example of a process of computing statistical operation data using a mobile terminal according to an embodiment of the present invention.

FIG. 2 is a flowchart illustrating an example of the process of computing the statistical operation data using the mobile terminal according to an embodiment of the present invention.

In FIG. 2, it is presumed that the AVN system is an entity that receives a signal set from controllers of the vehicle and delivers the signal set to the mobile terminal, and the statistical operation data computed by the mobile terminal is transmitted to the TMS center.

Referring to FIG. 2, in S210, the TMS center provides the mobile terminal with an application in which a computational logic required for creating the statistical operation data is defined. This process may be performed again each time the computational logic needs to be changed after the process is performed once, and update of the application may be reported to the mobile terminal using a push notification or a scheme of transmitting link information (for example, a uniform resource locator (URL)) for application installation.

In addition, in S220, the AVN system and the mobile terminal may establish a wireless data path in a predetermined form. This process may be performed through an application provided from the TMS center.

In S230, when a user operates the vehicle, the controllers of the operated vehicle transmit operation data (that is, a controller area network (CAN) signal set) to the AVN system through a CAN network, and thus the AVN system may collect data in real time.

In S240, the AVN system transmits collected signal values to the connected mobile terminal in real time. The transmission may be performed at predetermined intervals instead of being performed in real time.

In S250, the mobile terminal receives a corresponding signal to compute the statistical operation data according to the computational logic defined in the application.

In this instance, Table 1 below shows an example of the signal set and the computational logic involved in the creation of the statistical operation data.

TABLE 1

| Item | Unit | Collection condition | Computational logic |
|---|---|---|---|
| Period of time when high RPM is used | Time (sec.) | Information about all vehicles during a predetermined period | ≥4000 rpm is maintained |
| Period of time and time when enrichment is entered | Number of times<br><br>Time (sec.) | | =One time (number of times of change from 0 to 1)<br>=1 is maintained |
| Number of times of operating 02 sensor preheating | Number of times | | =One time (number of times of change from 1 to 0) |
| Time when an engine cooling water temperature is raised to 110° C. or more | Time | | ≥110 hours |
| Number of times of lack of fuel | Number of times | | =One time |
| Number of times of lack of fuel in a climbing condition | Number of times | | =One time |

TABLE 1-continued

| Item | Unit | Collection condition | Computational logic |
|---|---|---|---|
| Engine limp-home operation control condition | Number of times | ≠0 Time | |
| Number of times of poor engine power | Number of times | | =One time |

Referring to Table 1, in an engine of a vehicle, a signal according to high power operation (high RPM or enrichment, and increase in cooling water temperature) or a signal according to abnormal condition (lack of fuel, control of a safety mode such as a limphome mode, etc.) may be used to create statistical operation data. In the computational logic, a specific RPM value or temperature value, etc. may be set in a counting condition.

In S260, computed statistical data is transmitted to the TMS center.

The computed statistical data may be transmitted to the AVN system in S270. In this case, the transmitted statistical data may be visually output through the display 140 of the AVN system in S280.

The AVN system may reduce operation load through the above-described processes. In addition, the TMS center may conveniently change a statistical logic by updating an application installed in a mobile terminal instead of updating the AVN system of the vehicle when the statistical logic needs to be changed.

According to at least one embodiment of the present invention, effects described below are obtained.

Since operation statistics of a vehicle are computed through a mobile terminal, a computational logic of the operation statistics may be conveniently updated simply by updating an application of the mobile terminal.

In addition, an additional load due to computation of operation statistics is not applied to an AVN system that continuously performs a navigation or multimedia function during operation.

Moreover, since data collected from a vehicle is preprocessed and provided to a data center, data traffic may be reduced.

An effect obtainable from the present invention is not limited to the above-mentioned effects, and other effects not mentioned may be clearly understood by those skilled in the art from the above description.

The above-described invention may be implemented as computer-readable code in a medium storing a program. A computer-readable medium includes all types of recording devices storing data that may be read by a computer system. Examples of the computer-readable medium include a hard disk drive (HDD), a solid state disk (SSD), a silicon disk drive (SDD), read only memory (ROM), a random access memory (RAM), a CD-ROM, a magnetic tape, a floppy disk, optical data storage, etc. and also include a carrier wave (e.g., data transmission over the Internet).

Therefore, the above-mentioned detailed description must be considered only for illustrative purposes instead of restrictive purposes in all aspects. The scope of the present invention must be decided by a rational analysis of the claims, and all modifications within an equivalent range of the present invention are within the scope of the present invention.

What is claimed is:

1. A method of collecting statistical operation data using an audio video navigation (AVN) system of a vehicle and a mobile terminal, the method comprising:
   wirelessly connecting the mobile terminal to the AVN system;
   receiving a signal set from at least one controller of the vehicle at predetermined intervals or based on an event created by the AVN system;
   transmitting the received signal set to the mobile terminal;
   generating statistical operation data with a computational logic included in the mobile terminal based on the signal set;
   transmitting, by the mobile terminal, the statistical operation data to a telematics service (TMS) center; and
   updating the computational logic in the mobile terminal when the TMS center changes the computational logic,
   wherein the computational logic includes a different logic for each signal set received from the at least one controller of the vehicle.

2. The method according to claim 1, wherein the transmitting is performed in real time.

3. The method according to claim 1, wherein an application in which a computational logic for creation of the statistical operation data is defined is installed in the mobile terminal.

4. The method according to claim 3, wherein the application is provided to the mobile terminal from the TMS center.

5. The method according to claim 1, further comprising:
   receiving the created statistical operation data from the mobile terminal; and
   visually outputting the received statistical operation data through a display of the AVN system.

6. The method according to claim 1, wherein the signal set includes a signal set of a controller area network (CAN) communication system.

7. The method according to claim 1, wherein the signal set includes at least one of engine state information.

8. A system for collecting statistical operation data of a vehicle comprising:
   a mobile terminal;
   an audio video navigation (AVN) system of a vehicle, the AVN system comprising:
      a wireless communication unit wirelessly connected to the mobile terminal;
      a wired communication unit for receiving a signal set from at least one controller of the vehicle at predetermined intervals or based on an event created by the AVN system; and
      a controller for controlling the wireless communication unit to transmit the received signal set to the mobile terminal such that the mobile terminal generates the statistical operation data with a computational logic included in the mobile terminal based on the received signal set; and
   a telematics service (TMS) center for receiving the created statistical operation data from the mobile terminal,
   wherein an application, in which a computational logic for creating the statistical operation data is defined, is installed in the mobile terminal, and is updated when the TMS center changes the computational logic, and
   wherein the computational logic includes a different logic for each signal set received from the at least one controller of the vehicle.

9. The system according to claim 8, wherein the controller performs a control operation such that the signal set is transmitted in real time.

10. The system according to claim 8, wherein the application is provided to the mobile terminal from the TMS center.

11. The system according to claim 8, the AVN system further comprises a display,
 wherein the controller performs a control operation such that the received statistical operation data is visually output through the display when computed statistical operation data is received from the mobile terminal.

12. The system according to claim 8, wherein the signal set includes a signal set of a controller area network (CAN) communication system.

* * * * *